United States Patent [19]

Barhen et al.

[11] Patent Number: 5,680,515
[45] Date of Patent: Oct. 21, 1997

[54] HIGH PRECISION COMPUTING WITH CHARGE DOMAIN DEVICES AND A PSEUDO-SPECTRAL METHOD THEREFOR

[75] Inventors: Jacob Barhen, LaCresenta; Nikzad Toomarian, Encino; Amir Fijany, Granada Hills; Michail Zak, Cypress, all of Calif.

[73] Assignee: California Institute of Technology, Pasadena, Calif.

[21] Appl. No.: 534,537

[22] Filed: Sep. 27, 1995

Related U.S. Application Data

[62] Division of Ser. No. 49,829, Apr. 19, 1993, Pat. No. 5,491,650.

[51] Int. Cl.$^6$ .................................................. G06F 15/00
[52] U.S. Cl. .................................................. 395/24
[58] Field of Search .................... 395/24, 23, 27, 395/25, 800; 365/238; 382/14; 377/60; 364/606

[56] References Cited

U.S. PATENT DOCUMENTS

| | | | |
|---|---|---|---|
| 4,464,726 | 8/1984 | Chiang | 364/606 |
| 4,607,344 | 8/1986 | Athale et al. | 364/841 |
| 4,893,255 | 1/1990 | Tomlinson, Jr. | 364/513 |
| 5,008,833 | 4/1991 | Agranat et al. | 364/513 |
| 5,054,040 | 10/1991 | Yariv et al. | 377/60 |
| 5,089,983 | 2/1992 | Chiang | 364/844 |
| 5,111,436 | 5/1992 | Subotic et al. | 365/238 |
| 5,153,923 | 10/1992 | Matsuba et al. | 382/14 |
| 5,220,642 | 6/1993 | Takahashi et al. | 395/25 |
| 5,258,934 | 11/1993 | Agranat et al. | 364/606 |
| 5,274,832 | 12/1993 | Khan | 395/800 |
| 5,283,855 | 2/1994 | Motomura et al. | 395/27 |
| 5,428,710 | 6/1995 | Toomarian et al. | 395/23 |
| 5,475,794 | 12/1995 | Mashiko | 395/24 |

OTHER PUBLICATIONS

Barhen et al., New directions in massively parallel neurocomputing, Fifth international conference. Neural networks and their applications, pp. 543–554. Nov. 6, 1992.

Sage et al., MNOS/CCD circuits for neural network implementations, IEEE international symposium on circuits and systems, pp. 1207–1209 May 11, 1989.

Schwartz et al., A programmable analog neural network chip, IEEE journal of solid-state circuits, vol. 24, issue 2, pp. 313–319 Apr. 1989.

Coolen et al., Evolution equations for neural networks with arbitrary spatial structure, First IEEE International conference on artificial neural networks, pp. 238–241 Oct. 16, 1989.

*Primary Examiner*—Robert W. Downs
*Assistant Examiner*—Sanjiv Shah
*Attorney, Agent, or Firm*—Michaelson & Wallace

[57] ABSTRACT

The present invention enhances the bit resolution of a CCD/CID MVM processor by storing each bit of each matrix element as a separate CCD charge packet. The bits of each input vector are separately multiplied by each bit of each matrix element in massive parallelism and the resulting products are combined appropriately to synthesize the correct product. In another aspect of the invention, such arrays are employed in a pseudo-spectral method of the invention, in which partial differential equations are solved by expressing each derivative analytically as matrices, and the state function is updated at each computation cycle by multiplying it by the matrices. The matrices are treated as synaptic arrays of a neural network and the state function vector elements are treated as neurons. In a further aspect of the invention, moving target detection is performed by driving the soliton equation with a vector of detector outputs. The neural architecture consists of two synaptic arrays corresponding to the two differential terms of the soliton-equation and an adder connected to the output thereof and to the output of the detector array to drive the soliton equation.

12 Claims, 10 Drawing Sheets

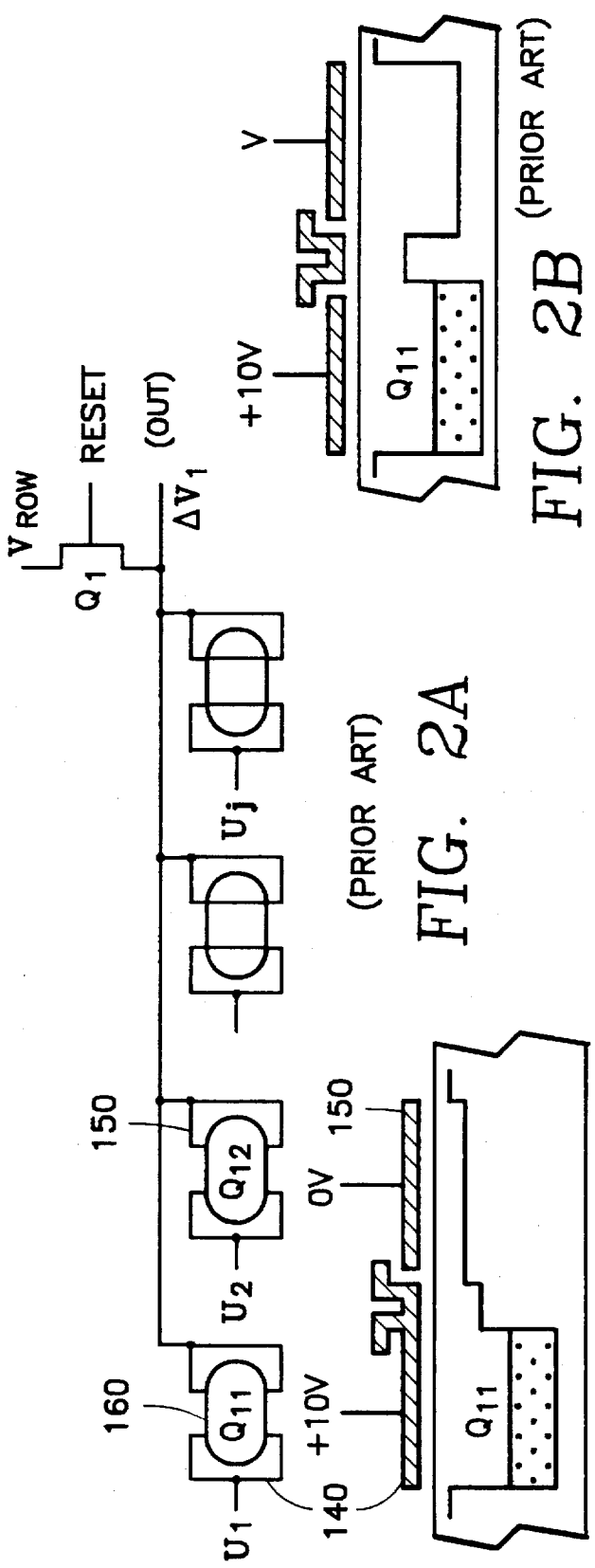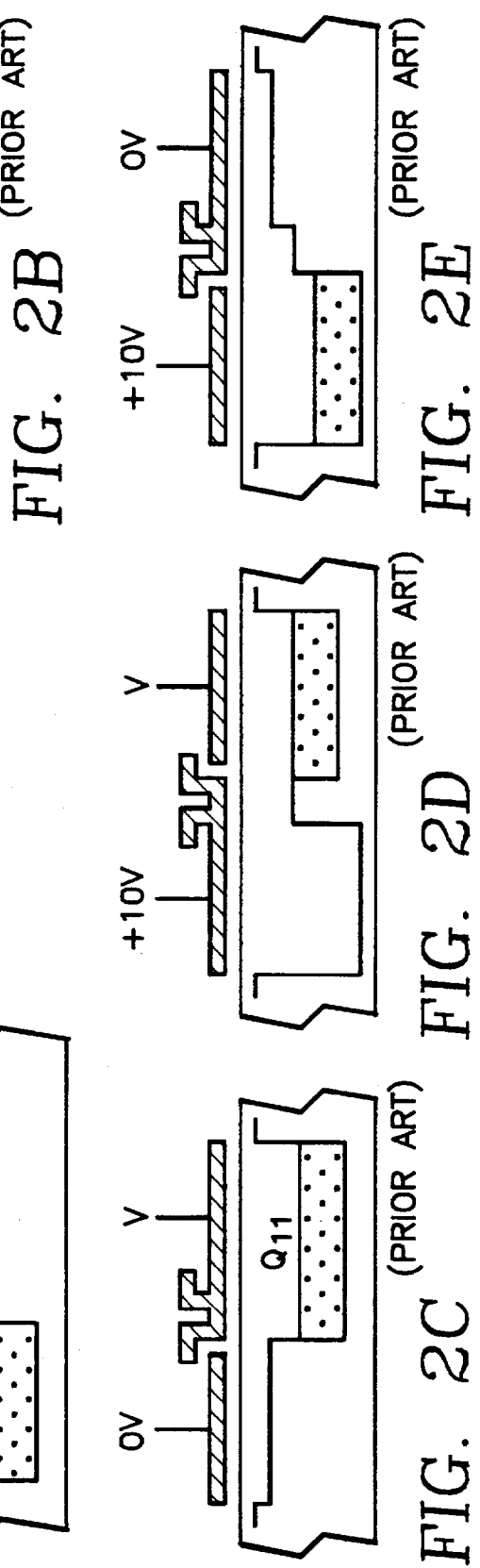

HIGH PRECISION COMPUTING WITH CHARGE DOMAIN DEVICES AND A PSEUDO-SPECTRAL METHOD THEREFOR

This is a division of application Ser. No. 08/049,829, filed Apr. 19, 1993 now U.S. Pat. No. 5,491,650.

ORIGIN OF THE INVENTION

The invention described herein was made in the performance of work under a NASA contract, and is subject to the provisions of Public Law 96-517 (35 USC 202) in which the contractor has elected to retain title.

BACKGROUND OF THE INVENTION

1. Technical Field

The invention relates to charge coupled device (CCD) and charge injection device (CID) hardware applied to higher precision parallel arithmetic processing devices particularly adapted to perform large numbers of multiply-accumulate operations with massive parallelism and to methods for solving partial differential equations therewith.

2. Background Art

"Grand Challenges" have been defined as fundamental problems in science or engineering, with broad economic and scientific impact, that could be advanced by applying high performance computing resources. While high speed digital computers with some level of parallelism are enabling the consideration of an ever growing number of practical applications, many very large-scale problems await the development of massively parallel hardware. To carry out the demanding computations involved in grand challenges, it is generally accepted that one needs to pursue a hybrid approach involving both novel algorithms development and revolutionary chip technology.

Many algorithms required for scientific modeling make frequent use of a few well defined, often functionally simple, but computationally very intensive data processing operations. Those operations generally impose a heavy burden on the computational power of a conventional general-purpose computer, and run much more efficiently on special-purpose processors that are specifically tuned to address a single intensive computation task only. A typical example among the important classes of demanding computations are vector and matrix operations such as multiplication of vectors and matrices, solving linear equations, matrix inversion, eigenvalue and eigenvector search, etc. Most of the computationally more complex vector and matrix operations can be reformulated in terms of basic matrix-vector and matrix-matrix multiplications. From a neural network perspective, the product of the synaptic matrix by the vector of neuron potentials is another good example.

An innovative hybrid, analog-digital charge-domain technology, for the massively parallel VLSI implementation of certain large scale matrix-vector operation, has recently been developed, as disclosed in U.S. Pat. No. 5,054,040. It employs arrays of Charge Coupled/Charge Injection Device (CCD/CID) cells holding an analog matrix of charge, which process digital vectors in parallel by means of binary, non-destructive charge transfer operations. FIG. 1 shows a simplified schematic of the CCD/CID array 100. Each cell 110 in the array 100 connects to an input column line 120 and an output row line 130 by means of a column gate 140 and a row gate 150. The gates 140, 150 hold a charge packet 160 in the silicon substrate underneath them that represents an analog matrix element. The matrix charge packets 160 are initially stored under the column gates 140. In the basic matrix-vector multiplication (MVM) mode of operation, for binary input vectors, the matrix charge packets 160 are transferred from under the column gate 140 toward the row gates 150 only if the input bit of the column indicates a binary 'one'. The charge transferred under the row gates 150 is summed capacitively on each output row line 130, yielding an analog output vector which is the product of the binary input vector with the analog charge matrix. By virtue of the CCD/CID device physics, the charge sensing at the row output lines 130 is of a non-destructive nature, and each matrix charge packet 160 is restored to its original state simply by pushing the charge back under its column gate 140.

FIG. 2 is an illustration of the binary-analog MVM computation cycle for a single row of the CCD/CID array. In FIG. 2A, the matrix charge packet 160 sits under the column gate 140. In FIG. 2B, the row line 130 is reset to a reference voltage. In FIG. 2C, if the column line 120 receives a logic one input bit, the charge packet 160 is transferred underneath the row gate 150. In FIG. 2D, the transferred charge packet 160 is sensed capacitively by a change in voltage on the output row line 130. In FIG. 2E the charge packet 160 is returned under the column gage 140 in preparation for the next cycle. A bit-serial digital-analog MVM can be obtained from a sequence of binary-analog MVM operations, by feeding in successive vector input bits sequentially, and adding the corresponding output contributions after scaling them with the appropriate powers of two. A simple parallel array of divide-by-two circuits at the output accomplishes this task. Further extensions of the basic MVM scheme of FIG. 1 support full digital outputs by parallel A/D conversion at the outputs, and four-quadrant operation by differential circuit techniques.

FIG. 3 illustrates how the matrix charge packets are loaded into the array. In FIG. 3A, appropriate voltages are applied to each gate 170 in each cell 110 of the CCD/CID array 100 so as to configure each cell 110 as a standard 4-phase CCD analog shift register to load all of the cells 110 sequentially. In FIG. 3B, the same gates 170 are used for row and column charge transfer operations as described above with reference to FIG. 2.

The particular choice for this unusual charge-domain technology resulted from several considerations, not limited to issues of speed and parallelism. In comparison to other, more common parallel high-speed technology environments (digital CMOS, etc.), the distinct virtues of the foregoing charge-domain technology for large-scale special-purpose MVM operations are the following:

Very High Density: The compactness of the CCD/CID cell allows the integration of up to $10^5$ cells on a 1 cm$^2$ die (in a standard 2 μm CMOS technology), providing single-chip 100 GigaOPS computation power.

Very Low Power Consumption: The charge stored in the matrix is conserved along the computation process because of the non-destructive nature of the CCD/CID operation. Hence, the entire power consumption is localized at the interface of the array, for clocking, I/O and matrix refresh purposes. This enables the processor to operate at power levels in the mW/TeraOPS range.

Scalability: The scalable architecture of the CCD/CID array allows the interfacing of many individual processors in parallel, combining together to form effective processing units of higher dimensionality, still operating at nominal speed.

I/O Flexibility: Although an analog representation is used inside the array to obtain fast parallel computation, the architecture of the processor provides the flexibility of a full digital interface, eliminating the bandwidth and noise problems typical for analog interfacing.

Programming Flexibility: The architecture allows for either optical (parallel, sustained) or electronic (semi-parallel, periodical) loading of the charge matrix. The latter method, described above with reference to FIG. 3, requires interrupts, of duration usually much shorter than the time interval in computation mode, for which the stored charge matrix remains valid before a matrix refresh is needed.

Preliminary results on a 128×128 working prototype, implemented on a single 4 mm×6 mm die in 2 μm CCD-CMOS technology, indicate a performance of approximately $10^{10}$ 8-bit multiply-accumulate operations per second. Processors with 1024×1024 cells will be realizable in the near future.

NEW DIRECTIONS EMERGING FROM THE PRESENT INVENTION

An innovative approach to parallel algorithms design remains a key enabling factor for high performance computing. In contrast to conventional approaches, one must develop computational schemes which exploit, from the onset, the concept of massive parallelism. The CCD/CID MVM approach discussed above represents a promising hardware technology for massively parallel computation, which offers both opportunities and challenges in the design of parallel algorithms. This new technology defies some of the most basic assumptions in the analysis of computational complexity of parallel algorithms. To clarify this, a short discussion is now given. In what follows, N×1 vectors and N×N matrices are considered. Also, m and a stand for multiplication and addition, respectively. One of the most fundamental results regarding the complexity of parallel computation involves the summation of N scalars.

Theorem 1.

The summation of N scalars can be performed in O(log N)a operations with O(N) processors. The complexity of some other matrix-vector operations follows from the above theorem as:

Corollary 1.1. A vector-dot product can be performed in O(log N)a+O(1)m operations with O(N) processors.

Corollary 1.2. A matrix-vector multiplication can be performed in O(log N)a+O(1)m operations with $O(N^2)$ processors.

Corollary 1.3. A matrix-matrix multiplication can be performed in O(log N)a+O(1)m operations with $O(N^3)$ processors.

The complexity of many other computational problems, including Fourier transforms and linear systems, can also be derived based on the above theorem and its corollaries. Currently, these results provide the framework for the design of efficient parallel algorithms. It should be mentioned that Corollaries 1.2 and 1.3 are more of a theoretical importance than a practical one, since the implementation of parallel algorithms achieving the above time-lower bounds requires rather complex two-dimensional processor interconnections. Interestingly, the result of Theorem 1 has been assumed to be independent of hardware technology. This reflects a basic feature of digital computers, which do not allow the simultaneous summation of N numbers.

The CCD/CID technology of FIGS. 1–3 defies this most basic assumption, since the summation of N numbers is just the summation of N charges, which can be performed simultaneously. This is a fundamental change, which leads to a new set of results regarding the complexity of parallel computation using CCD/CID architectures.

Theorem 2.

The summation of N scalars can be performed in O(1)a operations with O(N) "processors" (CCD/CID cells). The complexity of matrix-vector operations follows from the above theorem. In particular:

Corollary 2.1. A vector-dot product can be performed in O(1)a+O(1)m operations with O(N) "processors" or CCD/CID cells.

Corollary 2.2. A matrix-vector multiplication can be performed in O(1)a+O(1)m operations with $O(N^2)$ "processors" or CCD/CID cells.

Corollary 2.3. A matrix-matrix multiplication can be performed in O(1)a+O(1)m operations with $O(N^3)$ "processors" or CCD/CID cells.

The complexity of these operations is independent of the problem size, assuming that the chip size matches the problem. The above results are not only significant from a theoretical point of view, since they improve the known time-lower bounds in these computations, but are also of practical importance. They show that the design and analysis of parallel algorithms based on CCD/CID architectures is drastically different from that for conventional parallel computers. The CCD/CID chip is currently considered for performing Matrix-Vector Multiplication (MVM) for which it achieves the computation time given in Corollary 2.2. However, in order to output the results, k clock cycles are needed, where k is the required precision, in number of bits. The CCD/CID chip is most efficient for MVM computations wherein the matrix is known beforehand, as well as for series of MVMs performed with the same matrix. Despite this seemingly narrow function, the CCD/CID processor can be used for many applications,leading to new results. In the following, a few examples are given:

a. The Discrete Fourier Transform (DFT). The DFT can be presented as a MVM for which the time-lower bound can be derived from Corollary 2.2. The DFT represents an application for which the coefficient matrix is known beforehand. However, for both serial and conventional parallel computation, the FFT is always preferred due to its greater efficiency. In particular, for parallel computation, the asymptotic time lower bound of $O(log_2 N)$ can be achieved by using O(N) "processors". In contrast, for the CCD/CID chip the DFT is more efficient for large problems, and can be performed in O(k) steps with $O(N^2)$ CCD/CID cells. The computational complexity of O(k) not only improves the previously assumed time-lower-bound, but is also independent of the transform size.

b. Linear System Solution. For many applications, the solution of a linear system, Ax=b, is required, wherein the coefficient matrix A is known a priori. This is, for example, the case for the solution of partial differential equations (PDE) using a finite difference method, e.g., parabolic PDE, for which A is a tridiagonal matrix, or Poisson equation, for which A is block tridiagonal. For both cases, given the fact that A is positive definite, its inverse $A^{-1}$ can also be computed a priori. The linear systems solution can then be reduced to a simple MVM. However, this is not efficient for either serial or conventional parallel computation since, unlike A, the matrix $A^{-1}$ is dense. There are more efficient algorithms for both serial and parallel computation which exploit the sparse structure of A. For the CCD/CID chip, on the other hand, the unconventional and seemingly inefficient method is more suitable, since it solves the above linear system in O(k) steps with $O(N^2)$ CCD/CID cells.

c. Eigenvector Search. Given a matrix A having N linearly independent eigenvectors and associated eigenvalues, one often needs to find the eigenvector $v^{(1)}$ corresponding to the dominant eigenvalue $\lambda_1$. One available technique is the Power Method which, starting from an arbitrary vector $u^{(o)}$, performs successive MVMs $u^{(n)}=Au^{(n-1)}$. With a suitable scaling, this sequence converges to $cv^{(1)}$, for some constant c.

It is believed that charge-domain processors not only represent a new hardware computing technology, allowing high performance solutions for a large class of problems, but that they also affect many theoretical issues regarding the design and analysis of massively parallel algorithms. One area of particular importance for future advances is the need to extend the device's dynamic range (accuracy).

The advances in analog VLSI architectures discussed above provide a strong incentive to develop massively parallel algorithms for selected information processing problems. However, even though the hardware available to date is characterized by very high speed, its precision is typical of CCD/CID technology, i.e., of the order of 8 bits. Since each matrix element in FIG. 1 is represented by a charge packet, its accuracy is limited to the resolution of a CCD charge packet. A typical CCD charge packet is on the order of a million electrons, and this size limits its resolution to under 8 bits. Furthermore, voltage resolution (i.e., charge sensing) at the end of each row line is also of the order of 8 to 10 bits. Thus, both architectures and algorithms are needed, which not only are able to fully utilize the hardware's throughput, but also, ultimately, provide highly accurate results. Accordingly, it is an object of the present invention to extend the accuracy or resolution of CCD/CID MVM processors far beyond that currently available. It is a related object of the invention to do so without incurring a proportionate penalty in speed.

SUMMARY OF THE DISCLOSURE

The present invention enhances the bit resolution of a CCD/CID MVM processor by storing each bit of each matrix element as a separate CCD charge packet. The bits of each input vector are separately multiplied by each bit of each matrix element in massive parallelism and the resulting products are combined appropriately to synthesize the correct product. In one embodiment, the CCD/CID MVM array is a single planar chip in which each matrix element occupies a single column of b bits, b being the bit resolution, there being N rows and N columns of such single columns in the array. In another embodiment, the array constitutes a stack of b chips, each chip being a bit-plane and storing a particular significant bit of all elements of the matrix. In this second embodiment, an output chip is connected edge-wise to the bit-plane chips and performs the appropriate arithmetic combination steps. Such arrays are employed in a pseudo-spectral method of the invention, in which partial differential equations are solved by expressing each derivative analytically as matrices, and the state function is updated at each computation cycle by multiplying it by the matrices. The matrices are treated as synaptic arrays of a neural network and the state function vector elements are treated as neurons. Using such a neural architecture, both linear (e.g., heat) and non-linear (e.g., soilton) partial differential equations are solved. Moving target detection is performed by driving the soliton equation with a vector of detector outputs. The neural architecture consists of two synaptic arrays corresponding to the two differential terms of the soliton equation and an adder connected to the output thereof and to the output of the detector array to drive the soliton equation. A resonance phenomenon between the moving waves of the soliton equation and moving targets sensed by the detector array is observed which enhances the amplitude of the state function neuron elements at locations corresponding to target locations.

In a preferred embodiment, the MVM processor of the invention includes an array of N rows and M columns of CCD matrix cell groups corresponding to a matrix of N rows and M columns of matrix elements, each of the matrix elements representable with b binary bits of precision, each of the matrix cell groups including a column of b CCD cells storing b CCD charge packets representing the b binary bits of the corresponding matrix element, the amount of charge in each packet corresponding to one of two predetermined amounts of charge. Each of the CCD cells includes a holding site and a charge sensing site, each charge packet initially residing at the respective holding site. The MVM processor further includes a device for sensing, for each row, an analog signal corresponding to a total amount of charge residing under all charge sensing sites of the CCD cells in the row, an array of c rows and M columns CCD vector cells corresponding to a vector of M elements representable with c binary bits of precision, each one of the M columns of CCD vector cells storing a plurality of c charge packets representing the c binary bits of the corresponding vector element, the amount of charge in each packet corresponding to one of two predetermined amounts of charge. A multiplying device operative for each one of the c rows of the CCD vector cells temporarily transfers to the charge sensing site the charge packet in each one of the M columns of matrix cells for which the charge packet in the corresponding one of the M columns and the one row of the CCD vector cells has an amount of charge corresponding to a predetermined binary value.

The preferred embodiment further includes an arithmetic processor operative in synchronism with the multiplying a device including a device for receiving, for each row, the sensed signal, whereby to receive N×b signals in each one of c operations of the multiplying a device, a device for converting each of the signals to a corresponding byte of output binary bits, and a device for combining the output binary bits of all the signals in accordance with appropriate powers of two to generate bits representing an N-element vector corresponding to the product of the vector and the matrix.

In one embodiment, the array of matrix CCD cells is distributed among a plurality of b integrated circuits containing sub-arrays of the M columns and N rows of the matrix CCD cells, each of the sub-arrays corresponding to a bit-plane of matrix cells representing bits of the same power of two for all of the matrix elements. A backplane integrated circuit connected edgewise to all of the b integrated circuits includes a device for associating respective rows of the vector CCD elements with respective rows of the matrix CCD elements, whereby the multiplying device operates on all the rows of the vector CCD elements in parallel.

The invention further includes a neural architecture for solving a partial differential equation in a state vector consisting of at least one term in a spatial partial derivative of the state vector and a term in a partial time derivative of the state vector. The neural architecture includes a device for storing an array of matrix elements of a matrix for each partial derivative term of the equation, the matrix relating the partial derivative to the state vector, a device for multiplying all rows of the matrix elements by corresponding elements of the state vector simultaneously to produce terms of a product vector, and a device for combining the product vector with a previous iteration the state vector to produce a next iteration of the state vector. The equation can include plural spatial partial derivative terms wherein the neural architecture includes plural arrays of matrix elements of matrices corresponding to the partial spatial derivative terms and a device for combining the product vectors. The partial spatial derivative terms are definable over a spatial grid of points and the matrix elements are obtained in a pseudo-spectral analytical expression relating each matrix element to the distance between a corresponding pair of grid points.

In one embodiment of the neural architecture, moving targets are detected in the midst of noise in images sensed by an array of sensors, by the addition to the sum of product vectors of a vector derived from the outputs of the sensors, to produce a next iteration of the state vector. Preferably, the stored matrices implement a soliton equation having first and third order partial spatial derivatives of the state vector, so that the neural architecture includes a device for storing respective arrays corresponding to the first and third order derivatives. This produces two product vectors corresponding to the first and third order derivatives, respectively. This embodiment further includes a device for multiplying the product vector of the first order derivative by the state vector.

BRIEF DESCRIPTION OF THE DRAWINGS

FIG. 2 includes FIGS. 2A, 2B and 2C–E illustrating a sequence of matrix-vector multiply operations in a unit cell of the array of FIG. 1.

FIG. 9 includes data plots obtained in a computer simulation of the neural architecture of FIG. 8 in which the sensors only sense noise, of which

FIG. 10 includes data plots obtained in a computer simulation of the neural architecture of FIG. 8 in which the sensors sense a moving target with a per-pulse signal-to-noise ratio of −0 dB, of which

FIG. 11 includes data plots obtained in a computer simulation of the neural architecture of FIG. 8 in which the sensors sense a moving target with a per-pulse signal-to-noise ratio of −10 dB, of which

DETAILED DESCRIPTION OF THE PREFERRED EMBODIMENTS

ENHANCED BIT-RESOLUTION CCD MVM PROCESSOR

Figure 3A:
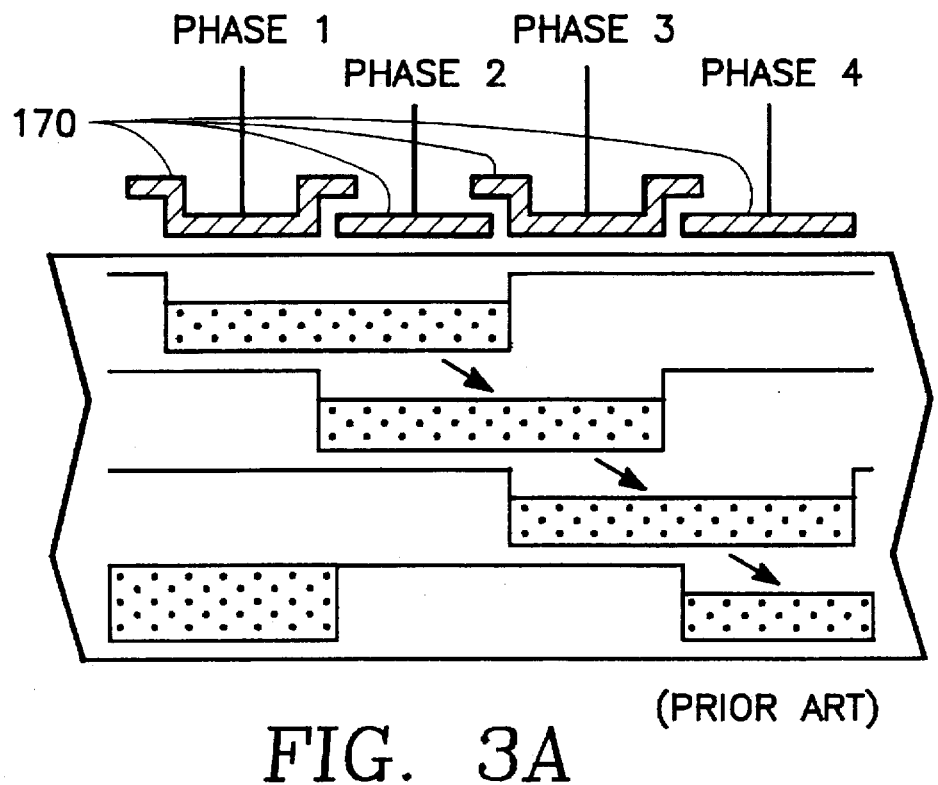
FIG. 3 includes FIGS. 3A and 3B illustrating, respectively, electronic loading of the matrix elements and arithmetic operations in a unit cell of the array of FIG. 1.
Figure 3B:
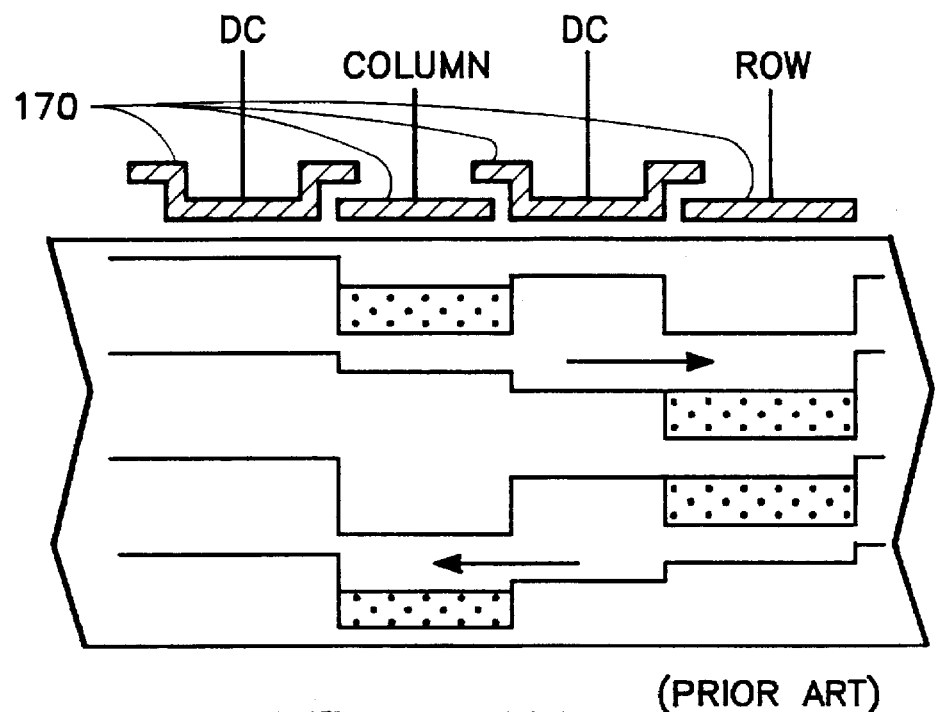
Figure 4:
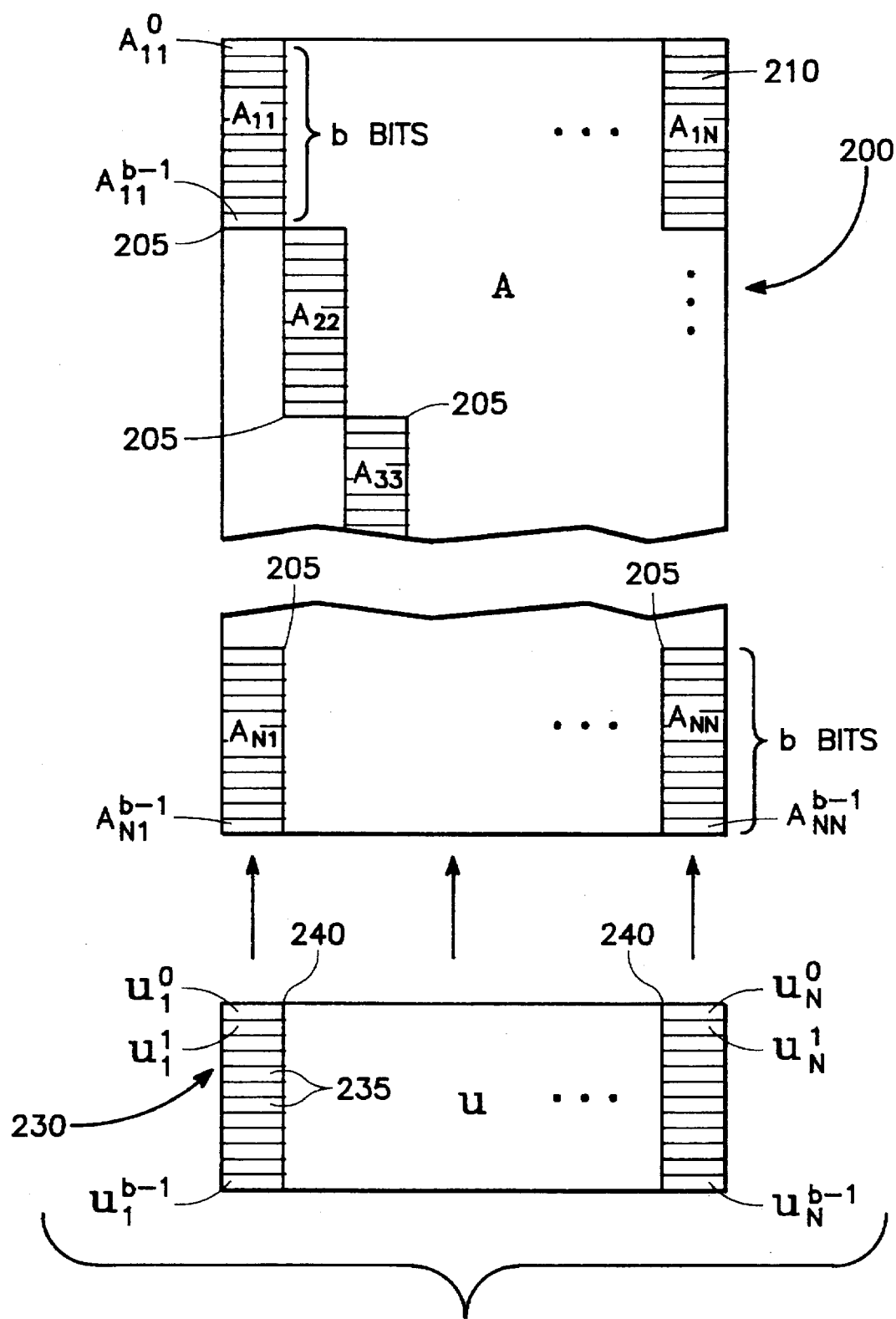
FIG. 4 is a plan view of a CCD/CID MVM processor of the present invention.
Figure 5:
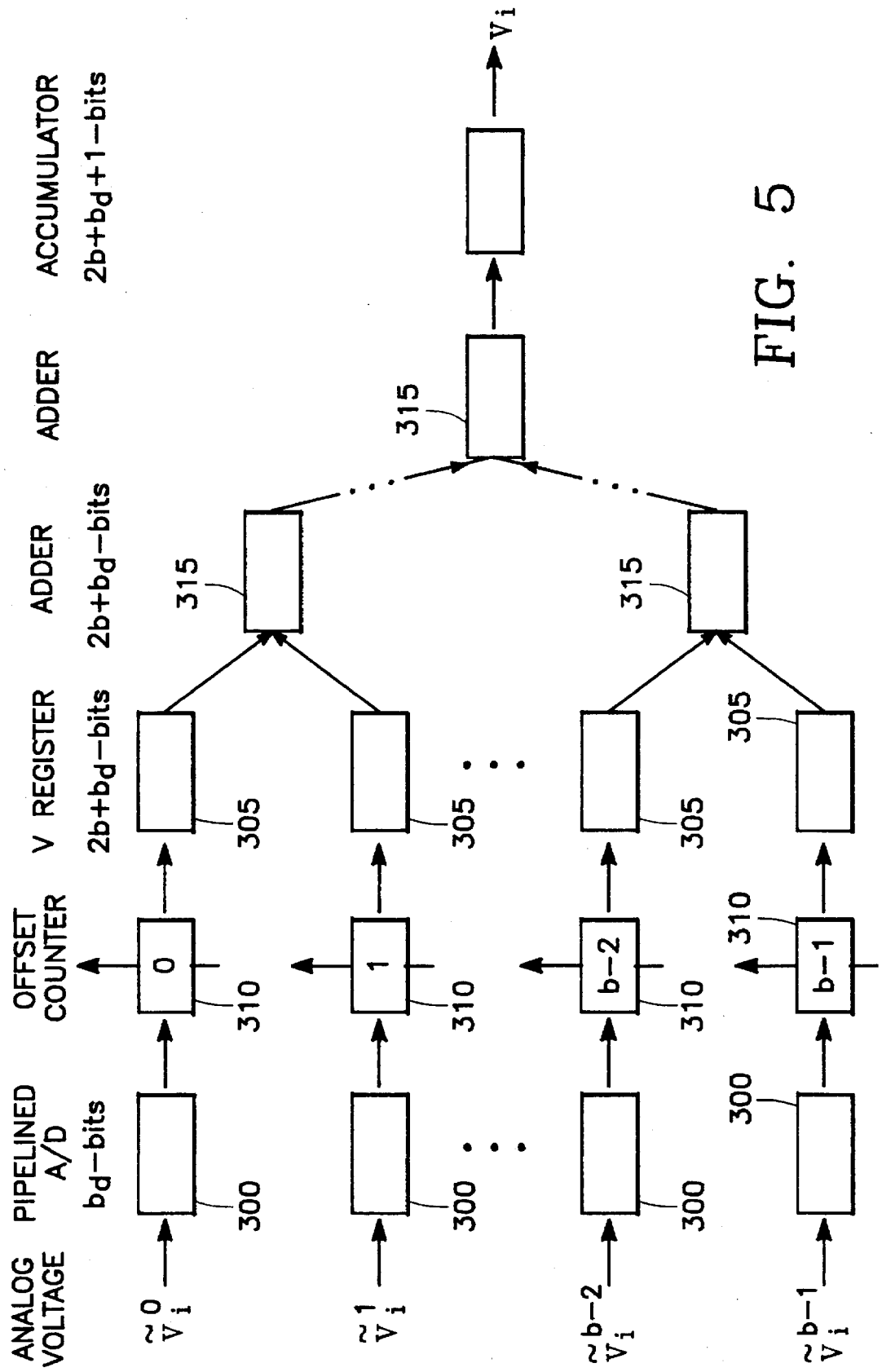
FIG. 5 is a schematic diagram of a typical architecture for a higher precision arithmetic processor employed in combination with the CCD/CID processor of FIG. 4.

In order to achieve high precision in a CCD/CID MVM processor, the present invention provides an advanced architecture which is illustrated schematically in FIGS. 4 and 5. In the following, the invention is described in its basic form. However, different architectures can be derived from this basic form which are not discussed here. A key element of the CCD/CID MVM array 200 of FIGS. 4 and 5 is the encoding in each CCD/CID processor cell 210 of one bit of the binary representation of each matrix element. As shown in FIG. 4, if a matrix A is to be specified with b bits of precision, each element $A_{ij}$ of the matrix occupies a single column 205 of b cells, namely cells corresponding to [b(i−1)+1,j], for l=1, ... b, labelled in FIG. 4 as $A_{ij}^0, \ldots A_{ij}^{b-1}$. Thus, the CCD/CID MVM processor array 200 of FIG. 4 is an array of N columns and N rows of matrix elements, each matrix element itself being a column 205 of b CCD/CID cells 210. There are, therefore, at total of N×N×b cells 210 in the array 200. A vector of N elements representable with a precision of b binary bits is stored in an array 230 of CCD/CID cells 235, the array 230 being organized in N columns 240 of b CCD/CID cells, each cell 235 in a given column 240 storing the corresponding one of the b binary bits of the corresponding vector element. Each CCD/CID cell 210 in FIG. 4 is of the type described above with reference to FIGS. 1–3 and is operated in the same manner with N column input lines (coupled to a successive row of N vector CCD/CID cells 235 in the vector CCD/CID array 230) and row output lines of the type illustrated in FIG. 1.

Matrix-vector multiplication will now be described with reference to the example of a conventional matrix-vector product obtained by adding the products of the elements in the vector and each row of the matrix. Of course, the present invention is not confined to a particular type of matrix vector product, and can be used to compute other types of matrix-vector products. One example of another well-known type of matrix-vector product is that obtained by adding the products of a respective vector element multiplied by all elements in a respective column of the matrix.

Computation proceeds as follows. At clock cycle one, the matrix A, in its binary representation, is multiplied by the binary vector labelled $u_1^0, \ldots u_N^0$, which contains the least significant bits of $u_1, \ldots u_N$ (i.e., by the top row of charge packets in the array 230 of vector CCD/CID cells 235). By virtue of the charge transfer mechanism, analog voltages labelled $^{(0)}\tilde{v}_1^0 \ldots ^{(0)}\tilde{v}_N^{b-1}$ are sensed at the output of each one of the b×N rows of the matrix array 200. To keep track of the origin of this contribution to the result, a left superscript $^{(0)}v$ is utilized in the notation employed herein.

In the present example, all of the products computed in the array 200 are synthesized together in accordance with corresponding powers of two to form the N elements of the transformed (output) vector. This is accomplished in an arithmetic processor illustrated in FIG. 5. The arithmetic processor is dedicated to the computation of the particular type of matrix-vector product computed in the present example. Processors other than that illustrated in FIG. 5 could be employed in making these same computations from the products produced by the array 200, and the present invention is not confined to the type of arithmetic processor illustrated in FIG. 5. Of course, in order to compute matrix-vector products different from the type computed in the present example, an arithmetic processor different from that illustrated in FIG. 5 would be employed in combination with the array 200 of FIG. 4.

At clock cycle two, the voltages sensed at each of the N rows are fed into respective pipelined A/D converters 300, each individual converter 300 having $b_d$ bits of precision (where $d=\log_2 N$, and N denotes the number of columns of A), while simultaneously A is multiplied by $u_1^1, \ldots u_N^1$, (i.e., by the second row of charge packets in the array 230 of vector CCD/CID cells), yielding $^{(1)}\tilde{v}$.

At clock cycle three, the digital representations of $^{(0)}\tilde{v}_1^0, \ldots {}^{(0)}\tilde{v}_N^{b-1}$ are bit-mapped into a V register 305 with an appropriate bit-offset toward the most significant bit position. Specifically, the result or element $\tilde{v}_i^l$ obtained during clock cycle k is offset in the appropriate V register by lk bits toward the most significant bit position (toward the leftmost bit) at clock cycle k. This offset is controlled by an offset counter 310 (which is incremented by one at each new clock cycle). Next, the voltages $^{(1)}\tilde{v}$ are fed into the A/D converters 300, and the vector $u_1^2, \ldots u_N^2$ multiplies A to yield $^{(2)}\tilde{v}$.

Elements $^{(k)}\tilde{v}_i^l$ with same row index i are then fed into cascaded sum circuits 315 shown in FIG. 5, in parallel for all i, and pipelined over k. The cascaded sum circuits 315 are connected in a binary tree architecture of the type well-known in the art. Hence, the components $v_i$ of the product v=Au are obtained after $\log_2 b$ cycles, and the overall latency is $b+\log_2 b+3$. If one needs to multiply a set of vectors u by the same matrix A, this pipelined architecture will output a new result every b clock cycles. Clearly, a far higher precision has been achieved than was previously available. An added benefit is that the refresh time overhead is significantly reduced, since in the matrix representation of FIG. 4 each electron charge packet only refers to a binary quantity.

Figure 6:
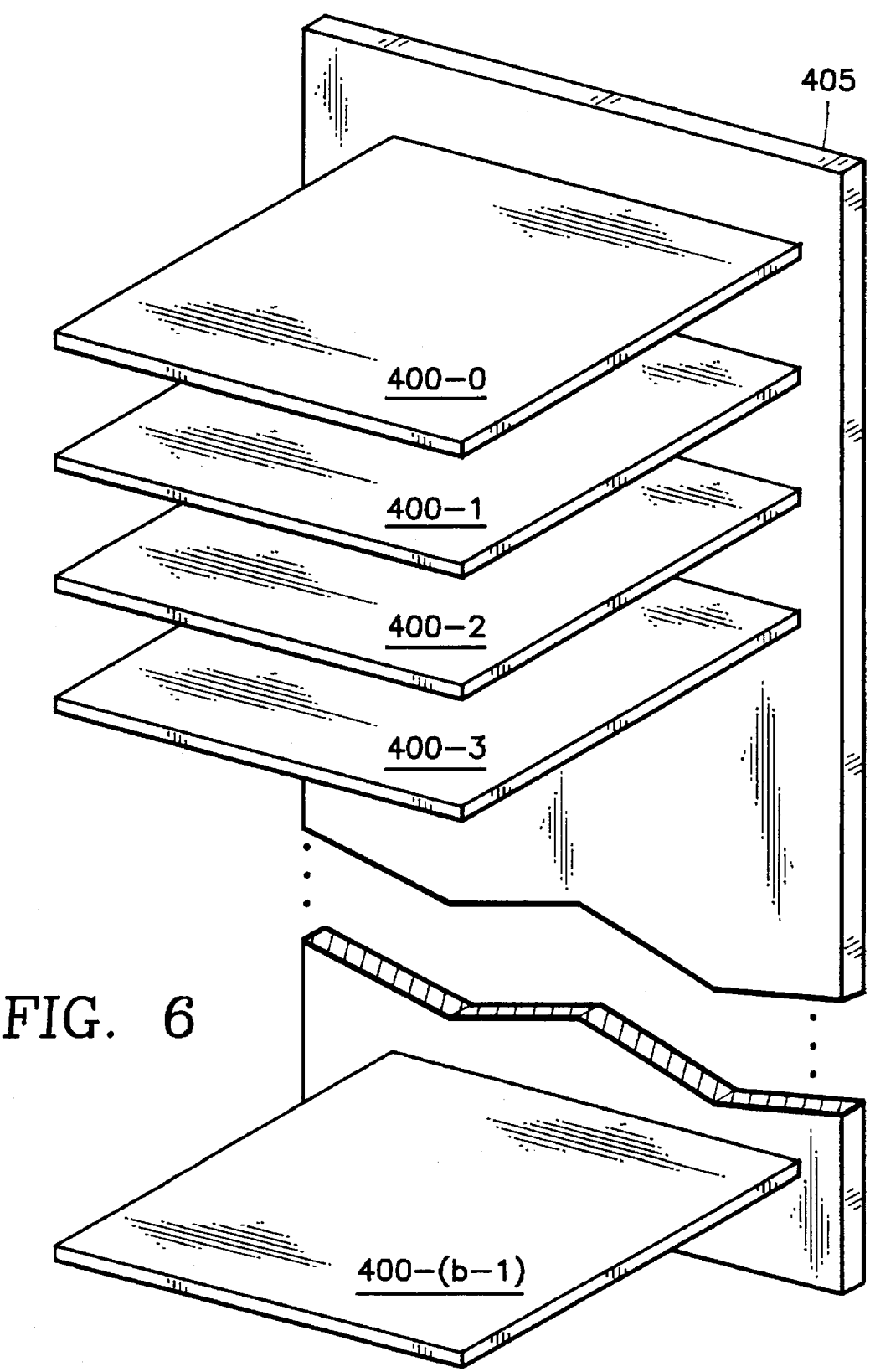
FIG. 6 is a diagram of a three-dimensional embodiment of the CCD/CID MVM processor of the present invention.

While FIG. 4 indicates that the N×b×N cells 210 of the array 200 are formed on a single planar silicon chip, the array 200 can instead be implemented using many chips connected together, using Z-plane technology, as illustrated in FIG. 6. In such an embodiment, it is preferable to have s each chip 400 assigned to a particular bit plane, in which each chip is an N-by-N CCD/CID array of CCD/CID cells 210 of the type illustrated in FIG. 1, which stores N×N bits or charge packets, which in the present invention, however, represent binary values only. The first chip 400-0 stores the least significant bits of all matrix elements of the N×N matrix, the second chip 400-1 storing the next least significant bits of all matrix elements, and so forth, and the last chip 400-(b-1) storing the most significant bits of all matrix elements. A backplane chip 405 implements the array 230 of N columns and b rows of vector CCD cells 235 of FIG. 4. The backplane chip is connected edge-wise to the column input lines of all of the bit-plane chips 400. This permits every one of the b rows of vector CCD/CID cells 235 to be input to column input lines of respective ones of the b bit-plane chips 400, greatly enhancing performance and reducing the latency of a given matrix-vector multiplication operation. The arithmetic processor of FIG. 5 could also be implemented on the backplane chip 405. The architecture of the arithmetic processor would depend upon the type of matrix-vector product to be computed. The Z-plane embodiment of FIG. 6 permits all b bits of every matrix element to be multiplied by a given vector element, and therefore is potentially much faster than the embodiment of FIGS. 4 and 5.

PSEUDO-SPECTRAL METHOD OVERVIEW

The pseudospectral neuralcomputing method of the present invention is now described, as it applies generally to a broad class of partial differential equations (PDE's), involving partial derivatives of various orders d of a state variable. For the sake of simplicity, the present discussion is limited to one "spatial" dimension x. Extension to multi-dimensional cases is straightforward. Thus, consider the state variable u(x, t), which is periodic over some interval which can, without loss of generality, be taken as an interval between 0 and L. The first step in the method is to transform the state variable u(x, t) into Fourier space with respect to x. The main advantage of this operation is that the derivatives with respect to x then become algebraic in the transformed variable. Before proceeding, the spatial interval [0, 2 πL] is normalized to the interval [0,2 π]. Certain classes of PDE's can then be re-stated in terms of the new state variable v(x, t) as $$v_t = \sum_d \alpha_d s^d v_d \tag{1}$$

where d is the order of the derivative of v with respect to x, $v_d$ is the partial $d^{th}$ derivative of v with respect to x and $v_t$ is the partial first derivative of v with respect to time. In order to numerically solve Eq. (1), the interval [0, 2 π] is discretized by 2N equidistant points, with spacing $\Delta_x = \pi/N$. The function v(x, t), which is defined only at these points, is approximated by $v(x_n, t)$, where $x_n = n\Delta_x$, and $n = 0, 1, \ldots, 2N-1$. The function $v(x_n, t)$ is now transformed to discrete Fourier space by $$V_k(t) = F_k[v] = \frac{1}{\sqrt{(2N)}} \sum_{n=0}^{2N-1} v(x_n, t) e^{-ikx_n} \tag{2}$$

where k takes the values $k=0, \pm 1, \ldots, \pm N$. The inversion formula is $$v(x_n, t) = F_n^{-1}\{V\} = \frac{1}{\sqrt{(2N)}} \sum_k V_k(t) e^{ikx_n} \tag{3}$$

This enables an efficient calculation of the derivatives of v with respect to x. In particular the $d^{th}$ partial derivative of v(x, t) is $$v_d = F^{-1}\{-(ik)^d * F[v]\} \tag{4}$$

where d is the order of the derivative and $i=\sqrt{-1}$. In the above expression, the symbol * denotes the Schur-Hadamard product of two N×1 matrices. It has been shown that such a representation of derivatives of periodic functions can be related to central difference approximations of infinite order. Combining Eq. (4) with a first order Euler approximation to the temporal derivative, yields the pseudospectral scheme for solving the PDE:

$$v(x_n, t + \Delta_t) = v(x_n, t) - \sum_d \alpha_d s^d \Delta_t \{F_n^{-1}[(ik)^d * V(t)]\} \tag{5}$$

where $\Delta_t$ denotes the time step size. Simple stability analysis reveals the following constraint $$\Delta_t 2/(\alpha N^2) \equiv \Delta_c \tag{6}$$

In order to map the proposed numerical solution of the PDE onto a MVM architecture, Eq. (4) is expanded by substituting the appropriate terms from Eqs. (2) and (3), as follows:

$$v_d(x_n,t) = \frac{1}{\sqrt{(2N)}} \sum_k (ik)^d \frac{1}{\sqrt{(2N)}} \sum_{m=0}^{2N-1} v(x_m,t) e^{-ikx_m} e^{ikx_n} \qquad (7)$$

By rearranging the terms:

$$v_d(x_n,t) = \sum_m v(x_m,t) \left( \frac{-1}{2N} \right) \sum_k (ik)^d e^{ik(x_n-x_m)} \qquad (8)$$

The last term in Eq. (8) can be represented by a constant matrix which depends solely on the distance between two spatial grid points, i.e., $$T_{nm}^d = -\frac{1}{2N} \sum_k (ik)^d e^{ik(x_n-x_m)} \qquad (9)$$

Since the function $v(x_n, t)$ is real, its derivatives should be real as well. Thus, only the real part of the matrix in Eq. (9) is needed for the computation of $v_m(x_n, t)$. Hence, $$T_{nm}^d = Re \left[ \left( \frac{-1}{2N} \right) \sum_k (ik)^d e^{ik(x_n-x_m)} \right] \qquad (10)$$

which is readily evaluated based upon the order d of each derivative in the PDE.

The neural architecture to be employed in solving the PDE can now be specified using the foregoing results. Let each grid point represent a neuron with activation function $v_n(t)$ equal to $v(x_n, t)$. Combining Eqs. 1 and 9, the network dynamics is readily obtained:

$$v_n(t) = \sum_d \alpha_d s^d \sum_m T_{nm}^d v_m(t) \qquad (11)$$

Thus, the pseudo-spectral architecture consists of 2N neurons, the dynamics of which is governed by a system of coupled linear differential equations, i.e., Eq. (11). The synaptic array, T, fully interconnects all neurons, and its elements are calculated using Eq. (10).

For illustrative purposes only, a first order Euler scheme is considered for the temporal dependence. The resulting neural dynamics is then ready for implementation on the CCD/CID architecture:

$$v_n(t + \Delta_t) = v_n(t) + \Delta_t \sum_d \alpha_d s^d \sum_m T_{nm}^d v_m(t) \qquad (12)$$

Figure 7:
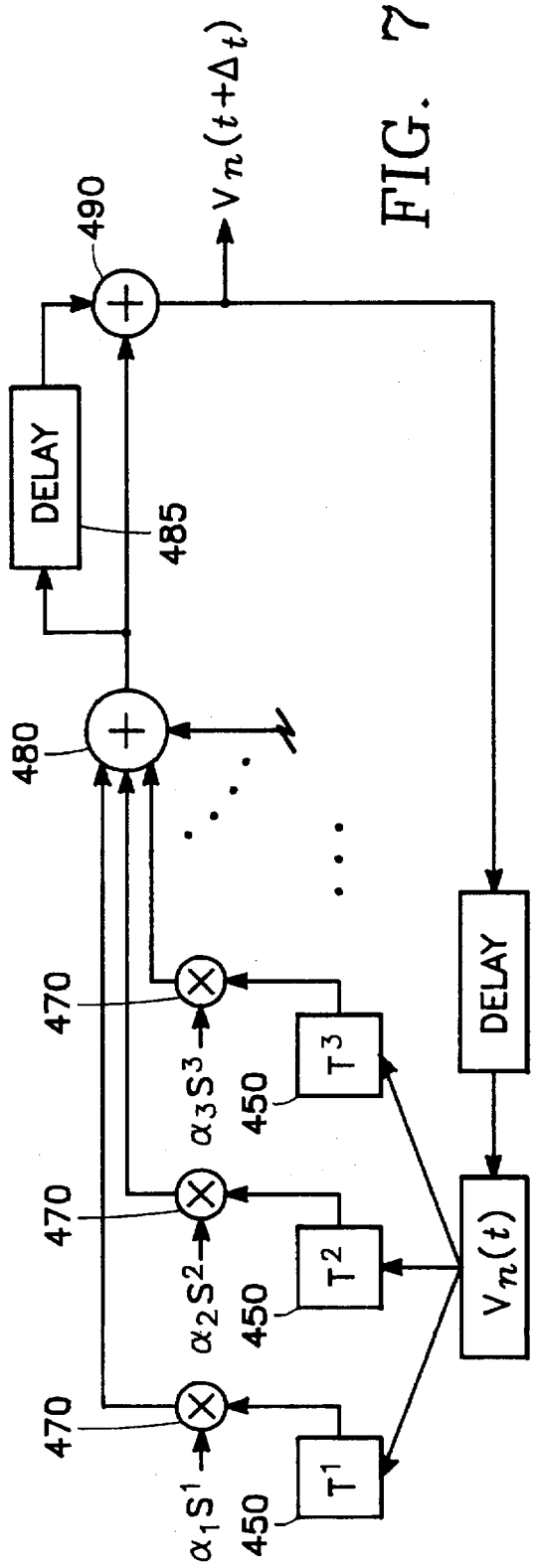
FIG. 7 is a schematic diagram of a general neural architecture for implementing the pseudo-spectral method of the present invention applied to linear partial differential equations.

An architecture for implementing Equation 12 is illustrated in FIG. 7. In FIG. 7, each array 450 labelled $T^1$, $T^2$, ... etc. is preferably a CCD/CID MVM processor of the type illustrated in FIGS. 4 and 5 and stores the matrix elements defined by Equation 10. Each array 450 receives the current neuron vector $v_n(t)$ from a common register 460 labelled $v_n(t)$. Multipliers 470 multiply the outputs of the arrays 450 ($T^1$, $T^2$, . . . etc.) by the appropriate coefficients from Equation 12 and an adder 480 sums the products together. A delay 485 implements the first term in Equation 12 and an adder 490 provides the final result $v_n(t+\Delta_t)$ in accordance with Equation 12. A second delay 495 provides the neuron vector $v_n(t)$ for the next computational cycle.

APPLICATION TO THE HEAT EQUATION

In order to provide a concrete framework for the proposed formalism, we focus our attention on the one-dimensional heat equation (Equation 13 below). This linear partial differential equation has the advantage of exhibiting both sufficient computational complexity, and possessing analytical solutions. This enables a rigorous benchmark of the proposed neural algorithm. The heat equation is:

$$u_t = \alpha u_{xx} \qquad (13)$$

where u denotes the temperature, and $\alpha$ is the thermal diffusivity. Partial derivatives of u with respect to time and space are denoted by $u_t$ and $u_x$ respectively. The following working example concerns an infinite slab, of thickness L, with an initial temperature distribution at time t=0 of $$u(x, 0)=1-\cos(2 \pi x/L) \quad 0 \leq x \leq L$$

It is assumed that the slab is insulated at both ends, so that no heat flows through the sides. Thus, the following periodic boundary conditions apply:

$$[u_x]_{x=0}=0 \quad t \geq 0 \qquad (14)$$

$$[u_x]_{x=L}=0 \quad t \geq 0 \qquad (15)$$

PSEUDOSPECTRAL SOLUTION TO THE HEAT EQUATION

Application of the pseudospectral numerical method of the invention scheme to the heat equation will now be described. This first step is to transform u(x, t) into Fourier space with respect to x. The main advantage of this operation is that the derivatives with respect to x then become algebraic in the transformed variable. Before proceeding, the spatial period is normalized to the interval [0, 2 $\pi$]. The scaled heat equation can then be expressed in terms of the new state variable v(x, t) as $$v_t = \alpha s^2 v_{xx} \qquad (16)$$

where s is defined as $2\pi/L$. In order to numerically solve Eq. (16), the interval [0, 2 $\pi$] is discretized by 2N equidistant points, with spacing $\Delta_x=\pi/N$. The function v(x,t), which is defined only at these points, is approximated by $v(x_n,t)$, where $x_n=n\Delta_x$, and n=0, 1, . . . , 2N−1. The function $v(x_n, t)$ is now transformed to discrete Fourier space by $$V_k(t) = F_k[v] = \frac{1}{\sqrt{(2N)}} \sum_{n=0}^{2N-1} v(x_n,t) e^{-ikx_n} \qquad (17)$$

where k takes the values k=0, ±1, . . . , ±N. The inversion formula is $$v(x_n,t) = F_n^{-1}\{V\} = \frac{1}{\sqrt{(2N)}} \sum_k V_k(t) e^{ikx_n} \qquad (18)$$

This enables an efficient calculation of the derivatives of v with respect to x. In particular $$v_{xx}=F^{-1}\{-k^2 * F[v]\} \qquad (19)$$

In the above expression, the symbol * denotes the Schur-Hadamard product of two N×1 matrices. Combining Eq. (19) with a first order Euler approximation to the temporal derivative, yields the pseudospectral scheme for solving the heat equation:

$$v(x_n, t+\Delta_t)=v(x_n, t)-\alpha s^2 \Delta_t\{F_n^{-1}[k^2*V(t)]\} \qquad (20)$$

where $\Delta_t$ denotes the time step size. The following constraint of Equation (6) applies:

$$\Delta_t < 2/(\alpha N^2) \equiv \Delta_c \qquad (21)$$

NEURAL NETWORK ARCHITECTURE FOR THE HEAT EQUATION

Figure 1:
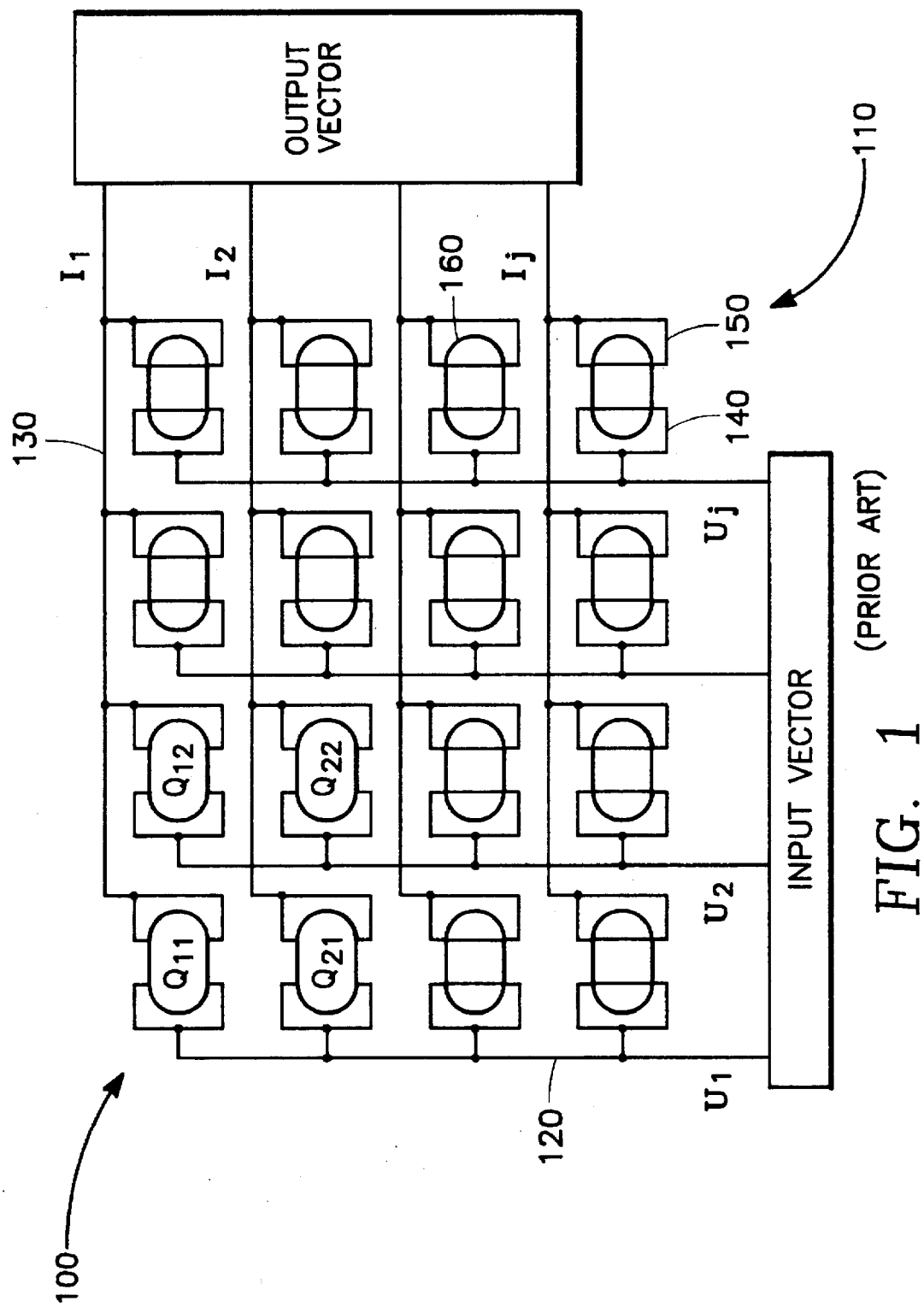
FIG. 1 is a simplified diagram of a CCD/CID MVM processor array of the prior art.

In order to map the proposed numerical solution of the heat equation onto the CCD/CID architecture of FIGS. 1 or 4, the spatial derivatives are evaluated using the Fourier transform formula of Eq. (19), which is expanded by substituting the terms from Eqs. (17) and (18) to obtain $$v_{xx}(x_n,t) = \tag{22}$$

$$\frac{1}{\sqrt{(2N)}} \sum_k (ik)^2 \frac{1}{\sqrt{(2N)}} \sum_{m=0}^{2N-1} v(x_m,t) e^{-ikx_m} e^{ikx_n}$$

By rearranging the terms:

$$v_{xx}(x_n,t) = \sum_m v(x_m,t) \left(\frac{-1}{2N}\right) \sum_k k^2 e^{ik(x_n-x_m)} \tag{23}$$

The last term in Eq. (23) can be represented by a constant matrix which depends solely on the distance between two spatial grid points, i.e., $$T_{nm} = -\frac{1}{2N} \sum_k k^2 e^{ik(x_n-x_m)} \tag{24}$$

Since the function $v(x_n, t)$ is real, its derivatives should be real as well. Thus, only the real part of the matrix in Eq. (24) is needed for the computation of $v_{xx}(x_n, t)$. Hence, $$T_{nm} = Re\left[\left(\frac{-1}{2N}\right) \sum_k k^2 e^{ik(x_n-x_m)}\right] \tag{25}$$

or, simply $$T_{nm} = -\frac{1}{2N} \sum_k k^2 \cos[k(x_n - x_m)] \tag{26}$$

The neural architecture can now be specified for the heat equation. Let each grid point represent a neuron with activation function $v_n(t)$ equal to $v(x_n, t)$. Combining Eqs. 16 and 26, the network dynamics is readily obtained:

$$\dot{v}_n(t) = \alpha s^2 \sum_m T_{nm} v_m(t) \tag{27}$$

Thus, the architecture consists of 2N neurons, the dynamics of which is governed by a system of coupled linear differential equations of Eq. (27). The synaptic array, T, fully interconnects all neurons, and its elements are calculated using Eq. (26).

For illustrative purposes only, a first order Euler scheme is considered for the temporal dependence. The resulting neural dynamics is then ready for implementation on the CCD/CID architecture:

$$v_n(t + \Delta_t) = v_n(t) + \Delta_t \alpha s^2 \sum_m T_{nm} v_m(t) \tag{28}$$

One may further rearrange the above equation to obtain $$v_n(t + \Delta_t) = \sum_m W_{nm} v_m(t) \tag{29}$$

$$W_{nm} = \delta_{nm} - \left(\frac{\alpha s^2 \Delta_t}{2N}\right) \sum_k k^2 \cos[k(x_n - x_m)] \tag{30}$$

denotes a synaptic matrix corresponding to the second spatial derivative in the heat equation, and includes the scaling factor, the time step, and the thermal diffusivity.

FAST NEURAL SOLUTION OF NON-LINEAR WAVE EQUATIONS

In the foregoing, the pseudo-spectral method was applied to solve linear partial differential equations such as the heat equation. The method is also applicable to quasi-linear approximations of non-linear partial differential equations such as the Korteweg-deVries equation for the soliton. The KdV or soliton equation was originally introduced to describe the behavior of one-dimensional shallow water waves with small but finite amplitudes. Since its discovery, solitons have enabled many advances in areas such as plasma physics and fluid dynamics. The following description concerns the one-dimensional KdV equation, which is:

$$u_t + auu_x + bu_{xxx} = 0 \tag{31}$$

where $u_t$ and $u_x$ denote partial derivatives of u with respect to time and space, respectively. If a and b are set to 6 and 1 respectively, an analytical solution to Equation 31 can be obtained for an infinite medium. This solution is:

$$u(x, t) = 2k^2 \operatorname{sech}^2(ks - 4k^3 t + \eta_0) \tag{32}$$

where k and $\eta_0$ are constants, with k>0. The above expression represents a solitary wave of amplitude $2k^2$ initially located at $x = -\eta_0/k$, moving at a velocity of $4k^2$. In order to numerically integrate the equation, the following boundary condition is imposed: $u(x+2L, t) = u(x, t)$ for t in the interval [0, T] and x in the interval [−L, L].

As in the application of the pseudo-spectral method to the heat equation, the spatial interval [−L, L] is normalized to the interval [0, 2π] using the transformation $(\pi/L)(x+L) = x$.

The KdV equation can then be re-stated as:

$$v_t + 6svv_x + s^3 v_{xxx} = 0 \tag{33}$$

where s=π/L.

Using steps analogous to those of Equations 1–11, Equation 33 becomes $$\dot{u}_n(t) = -su_n(t) \sum_m T_{nm}^1 u_m(t) - 6s^3 \sum_m T_{nm}^3 u_m(t) = 0 \tag{34}$$

where the matrices $T_{nm}^1$ and $T_{nm}^3$ are computed from Equation 10 as $$T_{nm}^1 = -\frac{1}{2N} \sum_k k \sin[k(x_n - x_m)] \tag{35}$$

$$T_{nm}^3 = -\frac{1}{2N} \sum_k k^3 \sin[k(x_n - x_m)] \tag{36}$$

The neural network architecture consists of 2N neurons, the dynamics of which are governed by Equation (34) defining a system of coupled non-linear differential equations. Two overlapping arrays, $T^1$ and $T^3$ fully interconnect all neurons.

In analogy with Equation 12, Equation 34 is recast using central difference temporal dependencies as follows:

$$v_n(t + \Delta_t) = v_n(t - \Delta_t) - 12\Delta_t sv_n(t) \sum_m T_{nm}^1 v_m(t) - \tag{37}$$

$$2\Delta_t s^3 \sum_m T_{nm}^3 v_m(t)$$

or $$v_n(t + \Delta_t) = v_n(t - \Delta_t) - v_n(t) \sum_m W_{nm}^1 v_m(t) - \sum_m W_{nm}^3 v_m(t) \tag{38}$$

where $$W_{nm}^1 = -(12s\Delta_t/2N) \sum_k k \sin[k(x_n - x_m)] \tag{39}$$

and $W^3$ is generalized for large intervals (small s) as:

-continued $$W^3_{nm} = (1/N) \sum_k \sin[s^3 k^3 \Delta_x (x_n - x_m)] \quad (40)$$

Here, $W^1$ and $W^3$ are the synaptic matrices corresponding to the first and third spatial derivatives in the KdV equation, and include the scaling factor as well as the time step. Their matrix elements are individually stored in corresponding matrix cells of an MVM processor such as the CCD/CID MVM processors of FIGS. 1 or 4.

MOVING TARGET DETECTION

The detection of targets moving in an environment dominated by "noise" is addressed from the perspective of nonlinear dynamics. Sensor data are used to drive the Korteweg-deVries (soilton) equation (Eqn. 33), inducing a resonance-type phenomenon which indicates the presence of hidden target signals. In this case, the right hand side of Eqn. 33 is not zero, but rather is set to equal the vector $S_n$ of derivatives of target sensor outputs.

Long-range detection of the motion of a target in an environment dominated by noise and clutter is a formidable challenge. Target detection problems are generally addressed from the perspective of the theory of statistical hypothesis testing. So far, existing methodologies usually fail when the signal-to-noise ratio, in dB units, becomes negative, notwithstanding the sophisticated but complex computational schemes involved. The present invention uses the phenomenology of nonlinear dynamics, not only to filter out the noise, but also to provide precise indication on the position and velocity of the target. Specifically, the invention employs the pseudospectral method described above to solve a driven KdV equation and achieve, by means of resonances, a dramatic enhancement of the signal to noise ratio.

To simplify the discussion, and with no loss of generality, only motion in $R^1$ space is considered. An array of N motion-detector "neurons" is fed signals $S_n(t)$ derived from an array of N sensors. Both arrays are linear, with equally spaced elements. Let $u_n(t)$ denote the temporal response of the n-th neuron. The two overlapping synaptic arrays, $W^1$ and $W^3$ of Equations 39 and 40 fully interconnect the network, which obeys the following system of coupled nonlinear differential equations:

$$v_n(t + \Delta_t) = v_n(t - \Delta_t) - v_n(t) \sum_m W^1_{nm} v_m(t) - \quad (41)$$
$$\sum_m W^3_{nm} v_m + S_n(t)$$

where $W_{nm}^1$ and $W_{nm}^3$ are the synaptic arrays defined in Equations 39 and 40. As in Eqn. 37, spatial organization will be considered over the interval $[0, 2\pi]$. The actual positions of neurons and sensors are given by the discrete values $x_n = n\Delta_x$ (n=0, ... N−1), with resolution $\Delta_x = 2\pi/N$. Thus, $u(x_n, t)$ is written $u_n(t)$. For convenience, N is even. The sensor derivative inputs to the network are denoted by $S_n(t)$.

Figure 8:
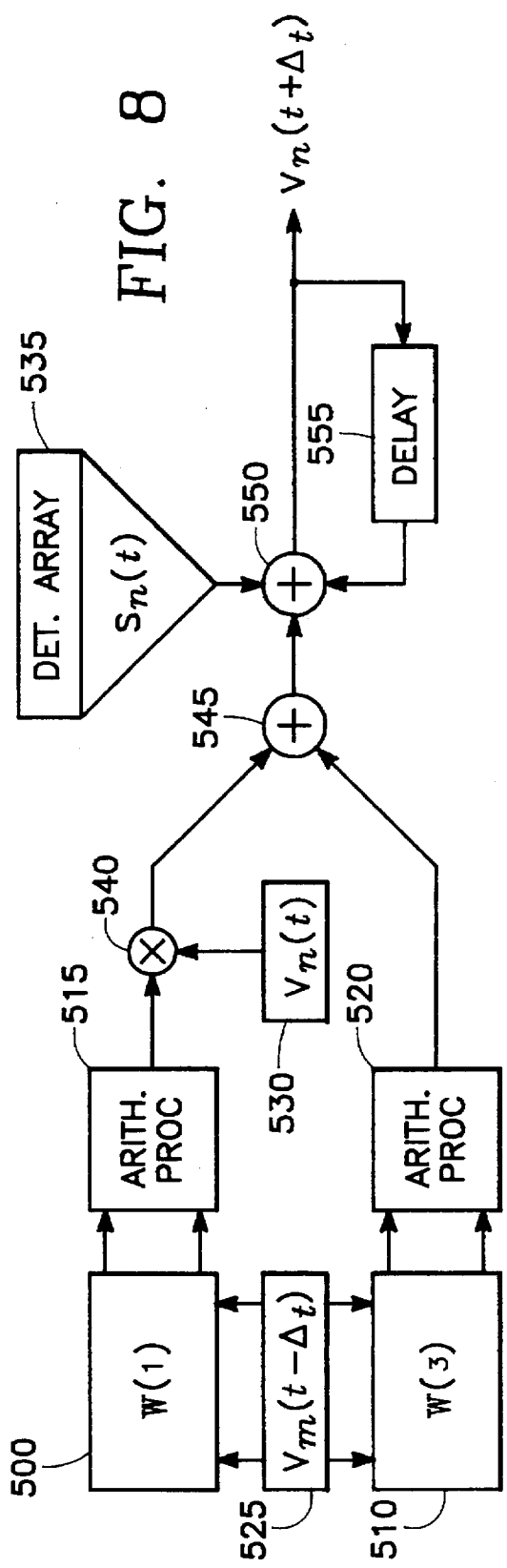
FIG. 8 is a schematic diagram of a neural architecture for performing the pseudo-spectral method applied to a non-linear partial differential equation and for performing target detection therewith.
Figure 9B:
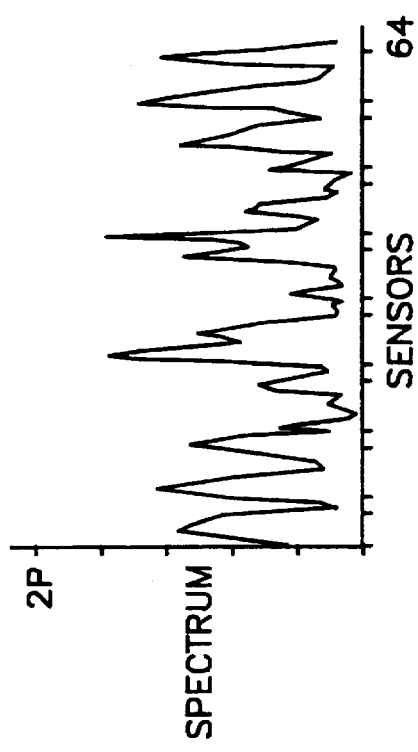
FIG. 9B is a spatial plot of the sensor inputs.
Figure 9D:
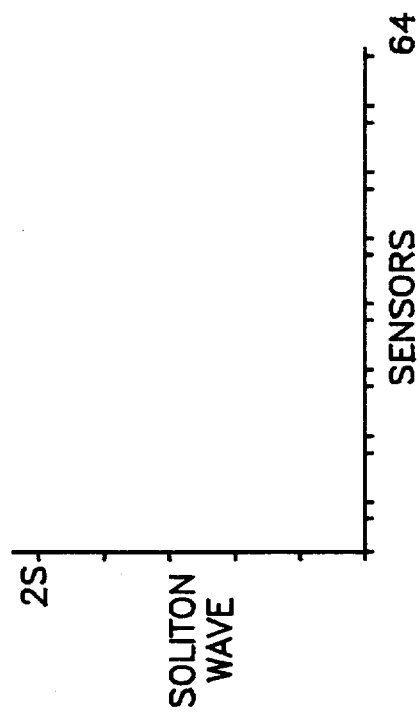
FIG. 9C is the network output and FIG. 9D is the filtered network output in which noise has been removed.
Figure 9A:
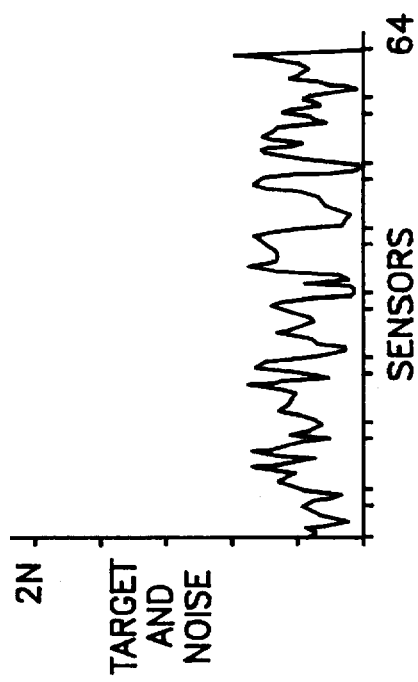
FIG. 9A is a Fourier spectrum of the sensor input.
Figure 9C:
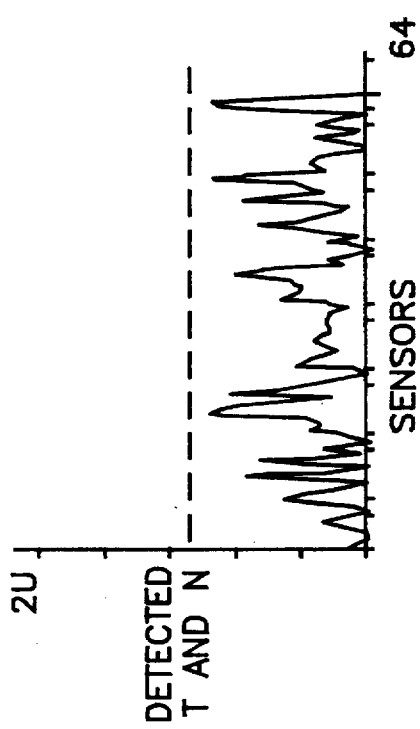
Figure 10A:
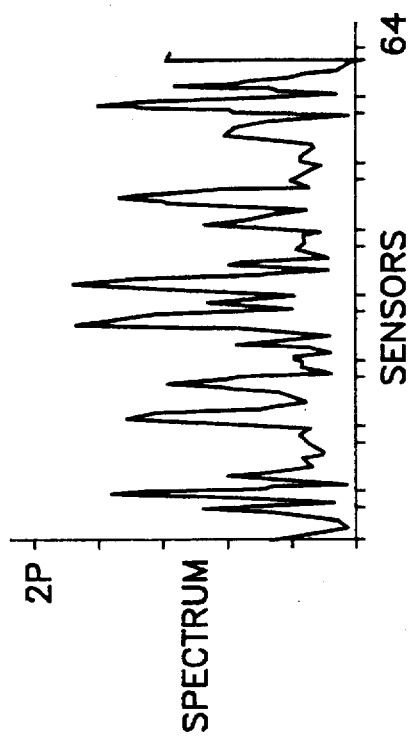
FIG. 10A is a Fourier spectrum of the sensor input.
Figure 10B:
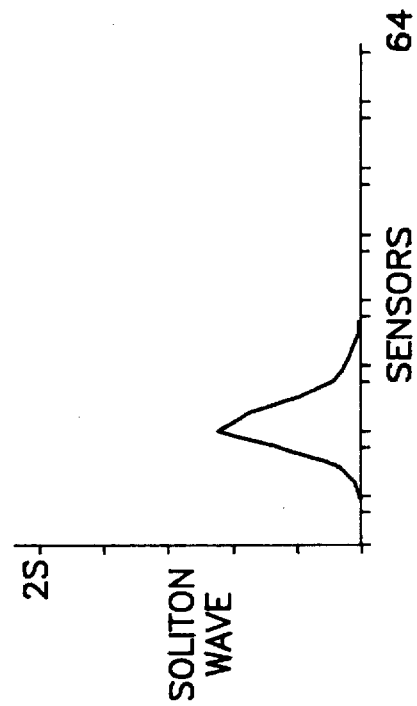
FIG. 10B is a spatial plot of the sensor inputs.
Figure 10C:
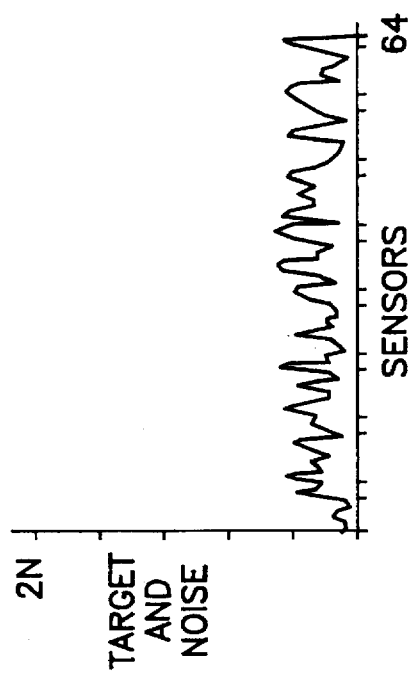
FIG. 10C is the network output and FIG. 10D is the filtered network output in which noise has been removed.
Figure 10D:
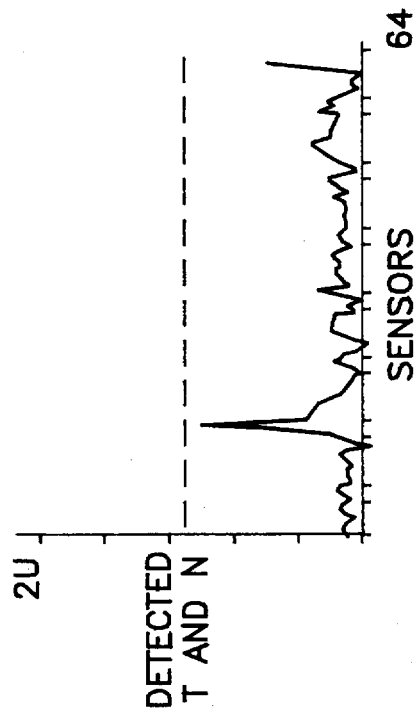
Figure 11A:
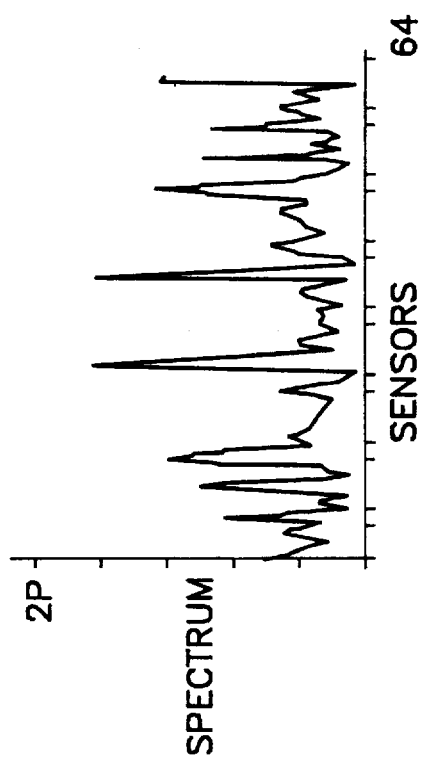
FIG. 11A is a Fourier spectrum of the sensor input.
Figure 11B:
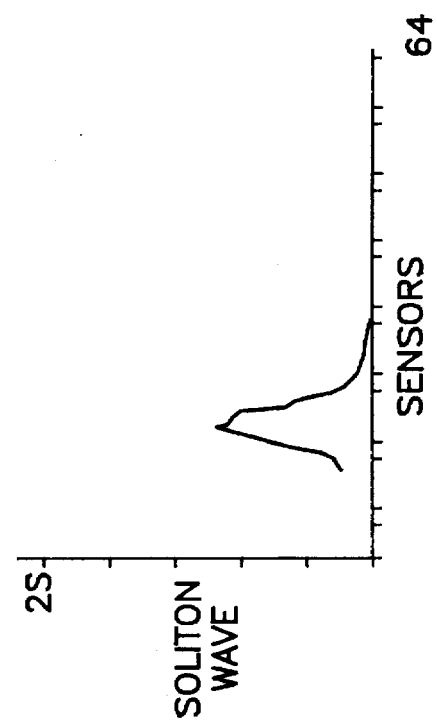
FIG. 11B is a spatial plot of the sensor inputs.
Figure 11C:
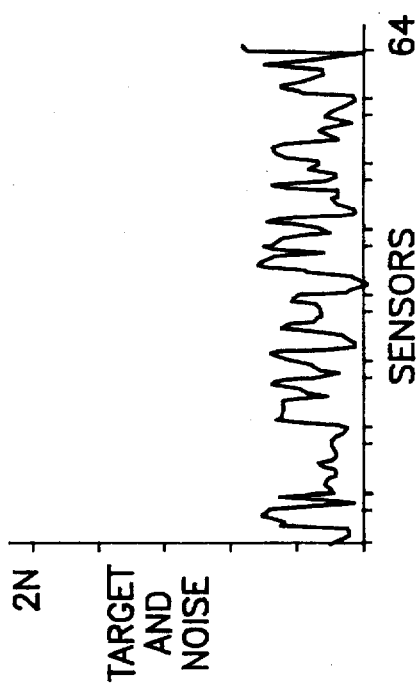
FIG. 11C is the network output and FIG. 11D is the filtered network output in which noise has been removed.
Figure 11D:
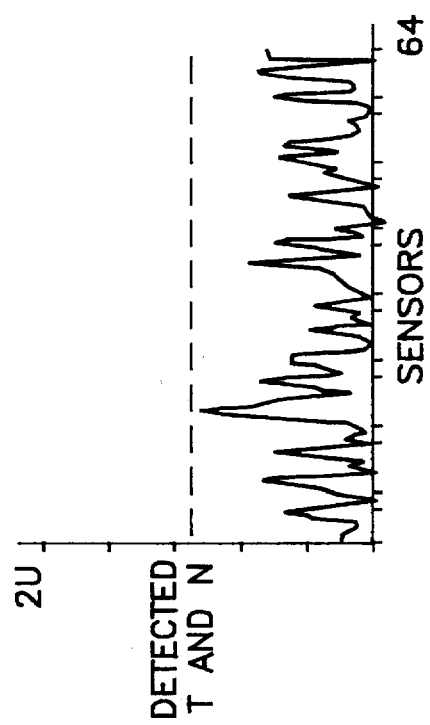

The corresponding hardware architecture is illustrated in FIG. 8. Synaptic arrays 500, 510 are each integrated circuits (chips) embodying CCD/CID arrays of the type illustrated in FIG. 4 and store the matrix elements of $W^1$ and $W^3$ respectively. Arithmetic processors 515, 520 are each chips embodying arithmetic processors of the type illustrated in FIG. 5. Registers 525 and 530 hold the current values of u(t). A detector array 535 furnishes the derivative signal vector $S_n(t)$. The second term of Equation 41 is implemented by the CCD/CID array 500, the arithmetic processor 515 and a multiplier 540. The third term of Equation 41 is implemented by the CCD/CID array 510, the arithmetic processor 520 and an adder 545. The last term of Equation 41 is implemented by the detector array 535 and an adder 550. A delay 555 implements the first term of Equation 41.

The results of a computer simulation of FIG. 8 are illustrated in FIGS. 9–11. Each drawing of FIGS. 9–11 includes four plots. The lower left corner (FIGS. 9A, 10A, 11A) shows the sensors input to the network. Since data are simulated, the contributions from the target and background noise are plotted separately, for illustrative purposes, even though the network actually receives only their combined value. The Fourier spectrum of the total signal is given in the upper left corner (FIGS. 9B, 10B and 11B). The network's output is plotted in the lower right corner (FIGS. 9C, 10C, 11C). Finally, the solution in absence of noise is shown in the upper right corner (FIGS. 9D, 10D, 11D).

The results are plotted after 10 time steps (using $\Delta_t=0.005$), and were obtained using a 64-element sensor array. FIG. 9 indicates that when only noise is fed to the network, no spurious result emerges. FIG. 10 illustrates the spectral network's detection capability for a target moving in a noise and clutter background characterized by a per pulse signal-to-noise (SNR) ratio of approximately 0 dB. Conventional detection methods usually reach their breaking point in the neighborhood of such SNR ratios. Finally, FIG. 11 presents results for a case where the SNR drops below −10 dB. The above SNR is by no way the limit, as can be inferred from the still excellent quality of the detection peak. Furthermore, multiple layers of the spectral neural architecture provide a "space-time" tradeoff for additional enhancement. The following presents a possible physical explanation of the detection phenomenon.

In interpreting the observed detection phenomenon of Eqn. 41, it is assumed that the sensor input to the network consists of two parts: (1) $\eta(x, t)$, space-dependent random oscillations; and (2) a "target" $\theta(x,t)$, the value of which is nonzero only over a few "pixels" of the sensor array. Since the KdV equations are non dissipative, and energy is pumped into the system via the $S(x, t)$ term, active steps have to be taken to avoid unbounded growth of the solutions. Furthermore, if v denotes the target's velocity, then $$\theta(x, t) = \theta(x - vt) \quad (42)$$

Thus, based upon the properties of the homogeneous KdV equation (Eqn. 34), the target signal $\theta(x, t)$ "resonates" with the "eigen-solitons" of the homogeneous equation. Hence, it will be amplified, while the random components $\eta(x, t)$ will be dispersed. Furthermore, such a "resonance" should not depend on the target velocity, since the velocity of the "eigen-solitons" of the KdV equations are not prescribed. In other words, the proposed methodology can detect targets over a wide range of velocities.

While the invention has been described in detail by specific reference to preferred embodiments, it is understood that variations and modifications thereof may be made without departing from the true spirit and scope of the invention.

What is claimed is:

1. A neural architecture for solving a partial differential equation in a state vector consisting of at least one term in a spatial partial derivative of said state vector and a term in a partial time derivative of said state vector, comprising:
   means for storing an array of matrix elements of a matrix for each partial derivative term of said equation, said matrix relating said partial derivative to said state vector;
   means for multiplying all rows of said matrix elements by corresponding elements of said state vector simultaneously to produce terms of a product vector; and means for combining said product vector with a previous iteration said state vector to produce a next iteration of said state vector.

2. The neural architecture of claim 1 wherein said equation comprises plural spatial partial derivative terms and said neural architecture comprises plural arrays of matrix elements of matrices corresponding to said partial spatial derivative terms and plural means for multiplying, said neural architecture further comprising means for combining the product vectors produced by said means for multiplying.

3. The neural architecture of claim 1 wherein said partial spatial derivative terms definable over a spatial grid of points and said matrix elements are obtained in a pseudo-spectral analytical expression relating each matrix element to the distance between a corresponding pair of grid points.

4. The neural architecture of claim 3 wherein the matrix element of column m and row n of the matrix is:

$$T_{nm}^d = Re\left[\left(\frac{-1}{2N}\right)\sum_k (ik)^d e^{ik(x_n - x_m)}\right]$$

where $x_n$ and $x_m$ are the corresponding pair of grid points, d is the order of the derivative and k is a one of a set of integers.

5. The neural architecture of claim 1 wherein said means for storing said array comprises:

an array of N rows and M columns of CCD matrix cell groups corresponding to a matrix of N rows and M columns of matrix elements, each of said matrix elements representable with b binary bits of precision, each of said matrix cell groups comprising a column of b CCD cells storing b CCD charge packets representing the b binary bits of the corresponding matrix element, the amount of charge in each packet corresponding to one of two predetermined amounts of charge.

6. The neural architecture of claim 5 wherein said means for multiplying comprises:

an array of c rows and M columns CCD vector cells corresponding to a vector of M elements representable with c binary bits of precision, each one of said M columns of CCD vector cells storing a plurality of c charge packets representing the c binary bits of the corresponding vector element, the amount of charge in each packet corresponding to one of two predetermined amounts of charge; and multiplier means operative for each one of said c rows of said CCD vector cells for generating, for each one of said rows of matrix CCD cells, a signal corresponding to the sum of all charge packets in both (a) said one row and (b) columns of said matrix CCD cells for which the corresponding vector CCD cell contains a charge packet of a predetermined amount.

7. A neural architecture for detecting moving targets in images sensed by an array of sensors, comprising:

means for storing an array of matrix elements of a matrix for each partial spatial derivative term of a partial differential equation in a state vector consisting of at least one term in a spatial partial derivative of said state vector and a term in a partial time derivative of said state vector, each matrix relating the corresponding spatial partial derivative to said state vector;

means for multiplying all rows of said matrix elements of each matrix by corresponding elements of said state vector simultaneously to produce a product vector for each matrix; and means for combining the product vectors with (a) a previous iteration said state vector and (b) a vector derived from the outputs of said sensors, to produce a next iteration of said state vector.

8. The neural architecture of claim 7 wherein said equation is a soliton equation having first and third order partial spatial derivatives of said state vector, whereby said neural architecture comprises means for storing respective arrays corresponding to said first and third order derivatives, whereby said means for multiplying produces two product vectors corresponding to said first and third order derivatives, respectively, said neural architecture further comprising means for multiplying the product vector of said first order derivative by said state vector.

9. The neural architecture of claim 8 wherein said partial spatial derivative terms are definable over a spatial grid of points corresponding to said sensor array and said matrix elements are obtained in a pseudo-spectral analytical expression relating each matrix element to the distance between a corresponding pair of grid points.

10. The neural architecture of claim 9 wherein the matrix element of column m and row n of the matrix is:

$$T_{nm}^d = Re\left[\left(\frac{-1}{2N}\right)\sum_k (ik)^d e^{ik(x_n - x_m)}\right]$$

where $x_n$ and $x_m$ are the corresponding pair of grid points, d is the order of the derivative and k is a one of a set of integers.

11. The neural architecture of claim 8 wherein said means for storing said array comprises:

an array of N rows and M columns of CCD matrix cell groups corresponding to a matrix of N rows and M columns of matrix elements, each of said matrix elements representable with b binary bits of precision, each of said matrix cell groups comprising a column of b CCD cells storing b CCD charge packets representing the b binary bits of the corresponding matrix element, the amount of charge in each packet corresponding to one of two predetermined amounts of charge.

12. The neural architecture of claim 11 wherein said means for multiplying comprises:

an array of c rows and M columns CCD vector cells corresponding to a vector of M elements representable with c binary bits of precision, each one of said M columns of CCD vector cells storing a plurality of c charge packets representing the c binary bits of the corresponding vector element, the amount of charge in each packet corresponding to one of two predetermined amounts of charge; and multiplier means operative for each one of said c rows of said CCD vector cells for generating, for each one of said rows of matrix CCD cells, a signal corresponding to the sum of all charge packets in both (a) said one row and (b) columns of said matrix CCD cells for which the corresponding vector CCD cell contains a charge packet of a predetermined amount.

* * * * *